US008717605B2

(12) United States Patent
Son

(10) Patent No.: US 8,717,605 B2
(45) Date of Patent: May 6, 2014

(54) IMAGE FORMING APPARATUS AND CIRCUIT BOARD OF IMAGE FORMING APPARATUS

(75) Inventor: Sung-woo Son, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 312 days.

(21) Appl. No.: 13/208,654

(22) Filed: Aug. 12, 2011

(65) Prior Publication Data

US 2012/0038937 A1 Feb. 16, 2012

(30) Foreign Application Priority Data

Aug. 12, 2010 (KR) ........................ 10-2010-0077863

(51) Int. Cl.
*G06F 3/12* (2006.01)

(52) U.S. Cl.
USPC ............ 358/1.15; 358/1.1; 358/1.13; 399/88; 399/90; 399/111

(58) Field of Classification Search
None
See application file for complete search history.

(56) References Cited

U.S. PATENT DOCUMENTS 6,826,376 B2 * 11/2004 An et al. ........................ 399/75
2010/0073837 A1 * 3/2010 Predtetchenski et al. .... 361/91.5

* cited by examiner

*Primary Examiner* — Miya J Cato
(74) *Attorney, Agent, or Firm* — Stanzione & Kim, LLP

(57) ABSTRACT

An image forming apparatus that includes a power supply unit to convert AC power input to the image forming apparatus into DC power, a high-voltage power unit to convert the converted DC power to high voltage, an image forming unit to form an image using the converted high voltage, and a controller to control operation of the image forming unit, where the power supply unit, the high-voltage power unit, and the controller are disposed on a single circuit board.

20 Claims, 7 Drawing Sheets

IMAGE FORMING APPARATUS AND CIRCUIT BOARD OF IMAGE FORMING APPARATUS

CROSS-REFERENCE TO RELATED APPLICATIONS

This application claims priority under 35 U.S.C. §119(a) from Korean Patent Application No. 10-2010-0077863, filed in the Korean Intellectual Property Office on Aug. 12, 2010, the disclosure of which is incorporated herein in its entirety by reference.

BACKGROUND

1. Field of the Invention

Exemplary embodiments of the present general inventive concept relate to an image forming apparatus and a circuit board of an image forming apparatus, and more particularly, an image forming apparatus in which a power circuit, a high-voltage power circuit, and a control circuit of the image forming apparatus are disposed on a single circuit board, and a circuit board of an image forming apparatus.

2. Description of the Related Art

An image forming apparatus represents an apparatus which prints an image corresponding to input original image data on a recording medium such as a printing paper. Examples of an image forming apparatus include a printer, a copy machine, and a fax machine. An electronic photographing method is employed by an image forming apparatus such as a Laser Beam Printer, an LED (Light Emitting Diode) Print Head (LPH) printer, and a fax machine.

In order to operate an image forming apparatus, a Switching Mode Power Supply (SNIPS) circuit which is a power circuit, a High Voltage Power Supply (HVPS) circuit which forms an image, and a control circuit which controls each component in the image forming apparatus are required. In a conventional image forming apparatus, each of the above circuits is disposed on a separate Printed Circuit Board (PCB).

If each circuit is disposed on a separate PCB, a plurality of PCBs are required, increasing volume and manufacturing cost of an image forming apparatus.

In addition, a harness is required to connect each PCB, further increasing manufacturing cost. Furthermore, EMI (electro-magnetic interference) measures should be prepared to remove EMI element which is emitted from the harness.

SUMMARY

Exemplary embodiments of the present general inventive concept relate to an image forming apparatus in which a power circuit, a high-voltage power circuit, and a control circuit of the image forming apparatus are disposed on a single circuit board, and a circuit board of an image forming apparatus.

Additional features and utilities of the present general inventive concept will be set forth in part in the description which follows and, in part, will be obvious from the description, or may be learned by practice of the present general inventive concept.

Exemplary embodiments of the present general inventive concept may provide an image forming apparatus including a power supply unit to convert alternating current (AC) power input to the image forming apparatus into direct current (DC) power, a high-voltage power unit to convert the converted DC power to a predetermined voltage, an image forming unit to form an image using the converted high voltage, and a controller to control an operation of the image forming unit, and the power supply unit, the high-voltage power unit, and the controller may be disposed on a single circuit board and coupled to one another without one or more wire harnesses.

The circuit board may be a one-layer circuit board having a conductive layer formed on a lower side of the circuit board.

At least one of a radial circuit element and an axial circuit element of the power supply unit and the high-voltage power unit may be disposed on an upper side of the circuit board.

The power supply unit, the high-voltage power unit and a surface-mounted device (SMD) of the controller may be disposed on a lower side of the circuit board.

A plurality of connectors may be disposed on an upper side of the circuit board.

The connectors may include an external communication connector which is connected with a print control terminal and an AC power connector which receives the AC power.

The external communication connector may be a universal serial bus (USB) connector, and a data line from the USB connector to the controller may have a line width of at least 10 mils, and a distance between a first data line (e.g., a D+ line) and a second data line (e.g., a D− line) from among a plurality of data lines may be more than 5 mils.

The controller may be a System on Chip (SoC) in which a microprocessor, a random access memory (RAM) and a flash memory are integrated.

The power supply unit may include a first circuit which operates in AC power and a second circuit which operates in DC power.

The first circuit may be spaced apart from the controller and the second circuit by more than 8 mm.

The first circuit may be disposed adjacent to one side of the second circuit and one side of the high-voltage power unit, and the second circuit may be disposed adjacent to one side of the first circuit and one side of the controller.

The power supply unit may be a Switching Mode Power Supply (SMPS), and the high-voltage power unit may be a High Voltage Power Supply (HVPS).

The image forming apparatus may further include a shield plate which is mounted on a lower side of the circuit board.

The image forming apparatus may further include a sensor disposed on an upper side of the circuit board to sense whether there is an image forming medium.

Exemplary embodiments of the present general may also provide a circuit board of an image forming apparatus that includes an SMPS circuit to convert AC power to DC power, a HVPS circuit to convert the converted DC power to high-voltage power, and a control circuit to control an image forming operation of an image forming apparatus, where at least a portion of the SMPS circuit, the HVPS circuit, and the control circuit may be fixed on a lower side of the circuit board and coupled to one another without one or more wire harnesses.

The control circuit may include a SoC in which a microprocessor, a RAM, and a flash memory are integrated.

The SMPS circuit may include a first circuit which operates in AC power and a second circuit which operates in DC power.

The first circuit may be spaced apart from the controller and the second circuit by more than 8 mm.

The first circuit may be disposed adjacent to one side of the second circuit and one side of the HVPS circuit, and the second circuit may be disposed adjacent to one side of the first circuit and one side of the control circuit.

The circuit board may further include a plurality of connectors which are disposed on an upper side of the circuit board and are electrically connected to an image forming unit of the image forming apparatus.

The circuit board may further include a sensor disposed on an upper side of the circuit board to sense whether there is an image forming medium.

Exemplary embodiments of the present general inventive concept may also provide a circuit board of an image forming apparatus, including a first power circuit to transform a first power type to a second power type, a second power circuit to convert the second power type to a predetermined power level, and a control circuit to control an image forming operation of the image forming apparatus, where at least a portion of the first power circuit, the second power circuit, and the control circuit are fixed on a first side of the circuit board.

The circuit board may also include at least one communication connector disposed on a second side of the circuit board, where a data line from the at least one communication connector to the controller has a line width of at least 10 mils, and where a distance between a first data line and a second data line is more than 5 mils.

Exemplary embodiments of the present general inventive concept may also provide an image forming apparatus, including a power supply to convert an input first power type to the image forming apparatus into a second power type, a power transformer to transform the second power type to a predetermined voltage level, an image forming unit to form an image using the predetermined voltage level, and a controller to control an operation of the image forming unit, wherein the power supply, the power transformer, and the controller are disposed on a single circuit board.

The image forming apparatus may also include where the power supply, the power transformer, and the controller are disposed on a first side of the single circuit board.

The image forming apparatus may also include where at least one communication connector disposed on a second side of the circuit board, where a data line from the at least one communication connector to the controller has a line width of at least 10 mils, and where a distance between a first data line and a second data line is more than 5 mils.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
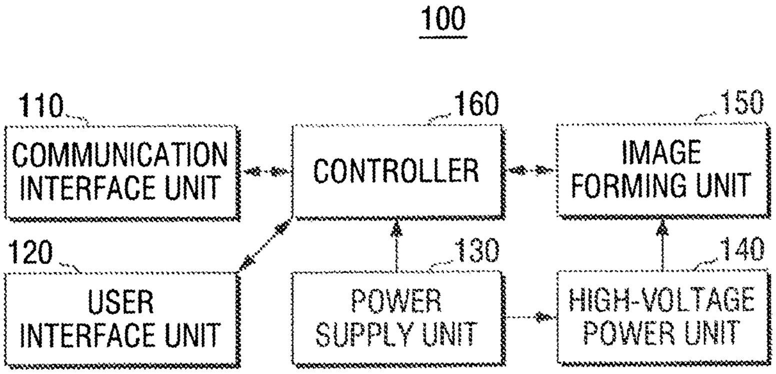
FIG. 1 is a block diagram illustrating an image forming apparatus according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus according to exemplary embodiments of the present general inventive concept.

Referring to FIG. 1, an image forming apparatus 100 can include a communication interface unit 110, a user interface unit 120, a power supply unit 130, a high-voltage power unit 140, an image forming unit 150, and a controller 160.

The communication interface unit 110 can connect the image forming apparatus 100 to a print control terminal (not illustrated). The print control terminal can include, for example, a personal computer, a laptop computer, a tablet or pad computer, or any other suitable device to carry out the exemplary embodiments of the present general inventive concept. Specifically, the communication interface unit 110 may be connected to the print control terminal using a USB (Universal Serial Bus) communication interface or any other suitable communication interface to carry out the exemplary embodiments of the present general inventive concept. The communication interface unit 110 may be connected to the print control terminal using an external communication connector (e.g., an external communication connector 211 illustrated in FIG. 2 and described below, that may be, for example, a USB port). In exemplary embodiments of the present general inventive concept, the print control terminal can be connected using a USB communication interface, but this is only an example. The external communication connector 211 may be a Local Area Network (LAN) port, a port connected to a telephone network, or a port connected to a wired and/or wireless communications network.

The communication interface unit 110 may receive print data from the print control terminal and transmit the received print data to the controller 160.

The user interface unit 120 can have a plurality of function keys through which a user may set or select one or more functions supported by the image forming apparatus 100. That is, the user interface unit 120 can receive one or more selections for one or more functions of the image forming apparatus 100. The user interface unit 120 may be a control panel such as a touch pad which may perform input and output simultaneously, or may be an apparatus which combines a mouse or other input device and a monitor. The user interface unit 120 may be connected to the control circuit 260 through a control panel connector 215.

The power supply unit 130 to generate power for the image forming apparatus 100. Specifically, the power supply unit 130 may convert AC (alternating current) power input from the outside of the image forming apparatus 100 to DC (direct current) power. In this case, the power supply unit 130 may be a Switching Mode Power Supply (SMPS). Since SMPS is a power supply which is widely used in a general image forming apparatus, detailed description regarding the function and configuration of SMPS will not be provided. In exemplary embodiments of the present general inventive concept, the power supply unit 130 can be an SMPS, but this is only an example. The power supply unit 130 may also be a transformer, a rectifier circuit, and a smoothing circuit.

The high-voltage power unit 140 generates a predetermined high-voltage power. Specifically, the high-voltage power unit 140 may generate a predetermined voltage to form an image by the image forming unit 150 using DC power generated by the power supply unit 130. The high-voltage power unit 140 may be a High Voltage Power Supply (HVPS). Since HVPS is a power supply which is widely used in a general image forming apparatus, detailed description regarding the function and configuration of HVPS will not be provided.

The image forming unit 150 can form an image on a paper and/or image forming medium. Specifically, the image forming unit 150 may form an image using power (e.g., high-voltage power) generated by the high-voltage power unit 140 that is controlled by the controller 160 of the image forming unit 150.

The controller 160 can control one or more components of the image forming apparatus 100. Specifically, when a print job is received through the communication interface unit 110, the controller 160 may control the image forming unit 150 to perform the received print job.

The controller 160 may control the operation of generating high-voltage power of the high-voltage power unit 140 according to an operation mode of the image forming apparatus 100. Specifically, when the image forming apparatus 100 operates in a power save mode, the controller 160 may control the high-voltage power unit 140 so as to not generate a predetermined high-voltage power.

The communication interface unit 110, the power supply unit 130, the high-voltage power unit 140, and the controller 160 may be disposed in a single circuit board 200. Hereinafter, detailed configuration of the circuit board 200 of an image forming apparatus according to exemplary embodiments will be explained with reference to FIGS. 2 to 4A.

Figure 2:
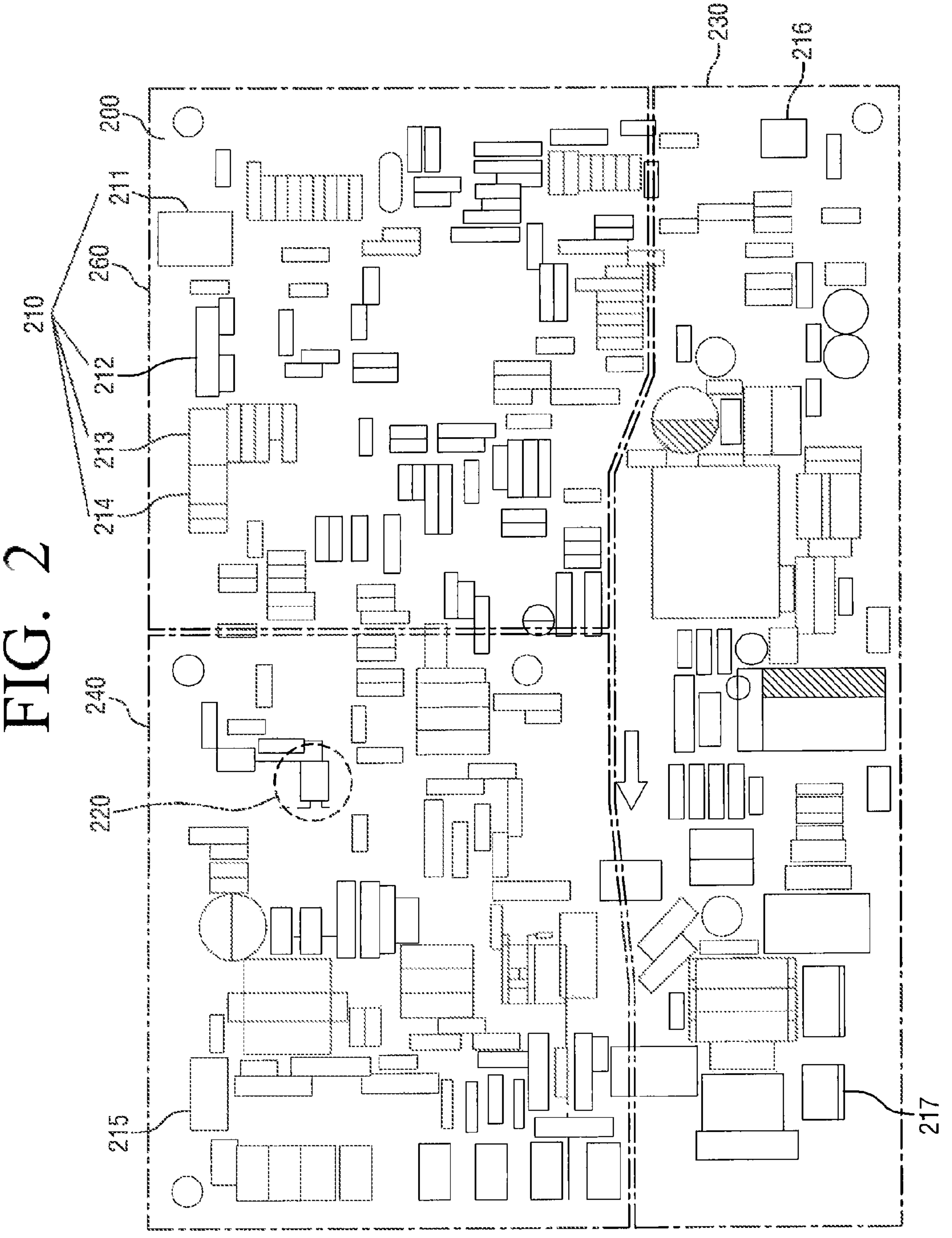
FIG. 2 is a view illustrating an upper side of a circuit board of an image forming apparatus according to exemplary embodiments of the present general inventive concept.
Figure 3:
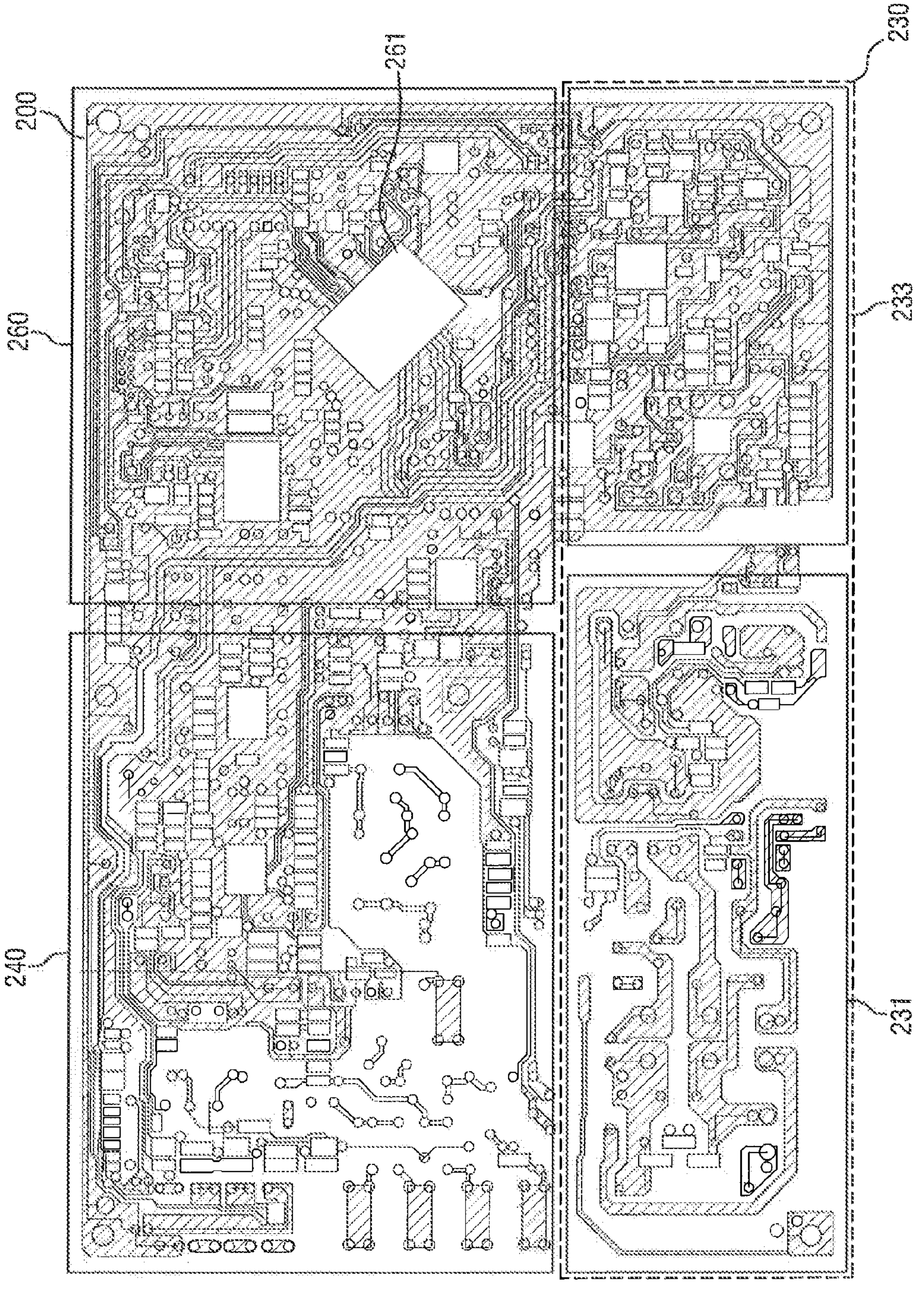
FIG. 3 is a view illustrating a lower side of a circuit board of an image forming apparatus according to an exemplary embodiments of the present general inventive concept.

FIG. 2 is a view illustrating an upper side of a circuit board of an image forming apparatus according to exemplary embodiments of the present general inventive concept, and FIG. 3 is a view illustrating a lower side of a circuit board by projecting the circuit board in FIG. 2.

Figure 4:
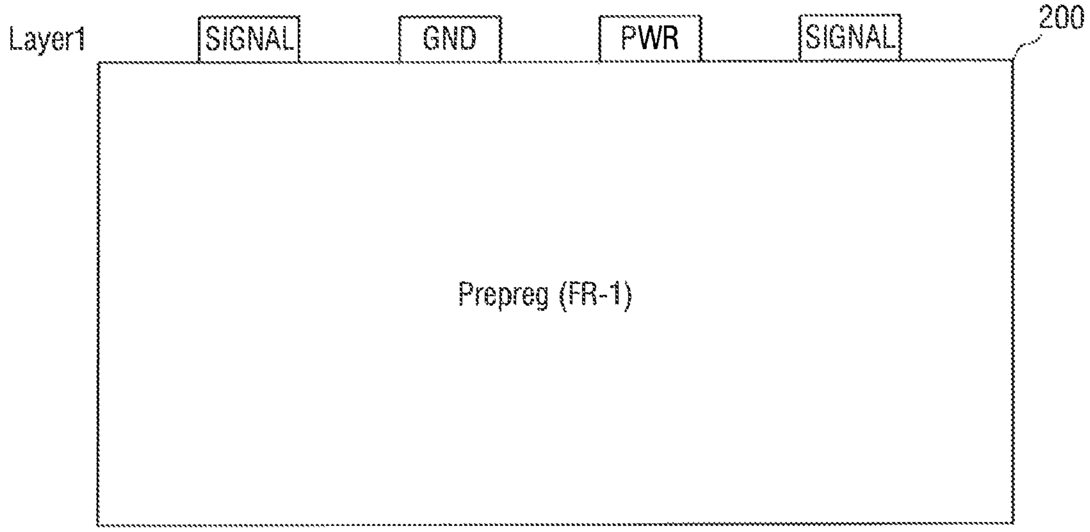
FIGS. 4 to 6 are views illustrating side surfaces of a circuit board of an image forming apparatus according to exemplary embodiments of the present general inventive concept.

The circuit board 200 is a PCB on which parts of the power supply unit 130, the high-voltage power unit 140, and the controller 160 can be disposed. Herein, the circuit board 200 may be a one-layer PCB which has a conductive layer on only one layer of the board as illustrated in FIG. 4 (e.g., Prepreg FR-1). In exemplary embodiments of the present general inventive concept, the circuit board 200 may be a one-layer PCB, but this is only an example. The circuit board may be a two-layer PCB.

Referring to FIGS. 2 and 3, the circuit board 200 of an image forming apparatus can include a connector 210, a sensor 220, an SMPS circuit 230, a HVPS circuit 240, and a control circuit 260.

The connector 210 can connect the circuit board 200 to an external apparatus or other components in the image forming apparatus 100 illustrated in FIG. 1. Specifically, the connector 210 can be disposed on an upper side of the circuit board 200 and may be electrically connected to a conductive layer on a lower side of the circuit board 200. The connector 210 may include an external communication connector 211, an LSU (Laser Scanning Unit) connector 212, a motor control connector 213, a clutch connector 214, a control panel connector 215, a fusing temperature detecting connector 216, and AC power connector 217.

Figure 6:
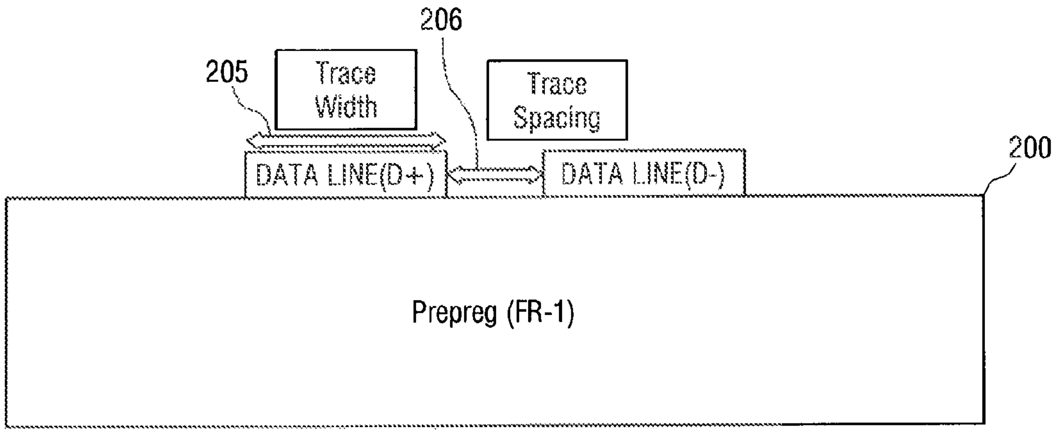

The external communication connector 211 can connect a print control terminal to the circuit board 200 and may be a USB connector. A data line width (i.e., a trace width) 205 (see, e.g., FIG. 6) between the communication connector 211 and a system-on-chip 261 in the control circuit may be more than 10 mils. A distance between a first data line (e.g., D+ line illustrated in FIG. 6) and a second data line (e.g., D− line illustrated in FIG. 6) from among a plurality of data lines (that is, distance between data lines 206 illustrated in FIG. 6) may be more than 5 mils.

As there may be no ground plane in a one-layer PCB, there may be increased difficulty in maintaining soundness of a signal. Accordingly, unlike a generate trace, design of trace spacing between data lines may have increased importance in a trace of a one-layer board. Therefore, as in the exemplary embodiments of the present general inventive concept illustrated in FIG. 6, soundness of a signal may be increased and/or secured by having a trace width of data lines be more than a minimum of 10 mils and trace spacing of data lines be more than 5 mils.

The LSU connector 212 can transmit a control signal for a Laser Scanning Unit (LSU) which may be the image forming unit 150, and the motor control connector 213 and the clutch connector 214 can transmit a control signal for a motor which may be at least part of the image forming unit 150.

The control panel connector 215 can transmit a control signal of a control panel which may be the user interlace unit 120, and the fusing temperature detecting connector 216 can receive a temperature of a fuser.

The AC power connector 217 can receive AC power transmitted from the outside of the image forming apparatus 100.

The sensor 220 can sense whether there is available image forming medium to form an image on (e.g., paper or any other suitable image forming medium). The sensor 220 is disposed on an upper side of the circuit board 200 and may sense whether there is a paper on the sensor 220. In exemplary embodiments of the present general inventive concept, the sensor 220 can be disposed on the circuit board 200, and thus there may be no need for a separate sub-PCB, thereby reducing manufacturing cost. As the circuit board 200 is disposed on the sensor 220 without a separate sub-PCB, unnecessary use of a harness may be minimized and/or prevented and EMI emitted from the harness may be reduced. As illustrated in FIG. 3, the sensor 220 may be included in the HVPS circuit 240 so as to receive the converted DC power from the SMPS circuit 230, as discussed below. The sensor 220 may be included in the HVPS circuit 240 so that the operation of the sensor 220 is not influenced by, for example, the conversion of AC power to DC power. As the HVPS circuit 240 may be used to form an image on an image forming medium, the sensor 220 may be included in the HVPS circuit 240 to sense whether an image forming medium is present that an image may be formed on.

The SMPS circuit 230 can convert AC power to DC power. The SMPS circuit 230 can provide power similarly to the power supply unit 130, and may convert AC power received from the AC power connector 216 to DC power. The SMPS circuit 230 may transmit DC power which has been converted (e.g., through a pattern and/or portion of the lower part of the circuit board 200) to the HVPS circuit 240 and the control circuit 260.

The SMPS circuit 230 may include a first circuit 231 and a second circuit 232. Herein, the first circuit 231 may be a circuit area which operates by AC power from among the SMPS circuit 230, and the second circuit 232 may be a circuit area which operates by DC power from the SMPS circuit 230.

The first circuit 231 can be a circuit area which operates by AC power, and thus the first circuit 231 may be disposed space apart from the second circuit 232 and the control circuit 260 by more than 8 mm. A PCB space may be minimized by disposing the second circuit 232 to be adjacent to the control circuit 260.

The HVPS circuit 240 can convert the converted DC power to a predetermined high-voltage power. The HVPS circuit 240 can perform similarly to the high-voltage power unit 140 described above, and may receive DC power generated by the SMPS circuit 230 through a pattern of the circuit board 200.

The HVPS circuit 240 may convert the received DC power to high-voltage power. The converted high-voltage fixed contact may be transmitted to a developer of the image forming unit 150 through a SUS (Silicon Unilateral Switch) or a Jumper, without going through a connector.

To minimize and/or prevent the operation of control circuit 260 from being influenced by high-voltage noise of the HVPS circuit 240, the HVPS circuit 240 may be spaced apart from the control circuit 260. Therefore, the SMPS circuit 230, the HVPS circuit 240, and the control circuit 260 in the circuit board 200 may be disposed as illustrated in FIGS. 2 and 3 according to exemplary embodiments of the present general inventive concept. The first circuit 231 of the SMPS circuit 230 may be disposed so that the right area of the first circuit 231 is adjacent to the left side of the second circuit 233 and the upper area is adjacent to the lower area of the HVPS circuit 240. The second circuit 233 of the SMPS circuit 230 can be disposed so that the left area of the second circuit 233 is adjacent to the right side of the first circuit 231 and the upper area is adjacent to the lower area of the control circuit 260.

The control circuit 260 can control an image forming operation. The control circuit 260 can perform operations similar to the communication interface unit 110 and/or the controller 160 described above, and may receive DC power generated by the SMPS circuit 230 through the control board 200. The control circuit 260 may control the operation of the image forming unit 150 based on a control command received through a connector and a sensor which are disposed on the circuit board 200.

Specifically, the control circuit 260 may include a System on Chip (e.g., SoC 261) of which RAM (Random Access Memory) can be integrally formed with a microprocessor. Herein, the SoC 260 may have an operation frequency that is greater than or equal to 300 Mhz. The SoC 261 may include serial flash memory. As the control circuit 260 according to exemplary embodiments of the present general inventive concept uses a SoC, patterning between a microprocessor and RAM may be omitted. That is, there may be no need for patterning between a microprocessor and RAM, and the SMPS circuit 230, the HVPS circuit 240, and the control circuit 260 may be fixed on one side of a circuit board. As such, if a circuit board is a one-layer board, manufacturing cost for an image forming apparatus may be reduced.

Figure 4A:
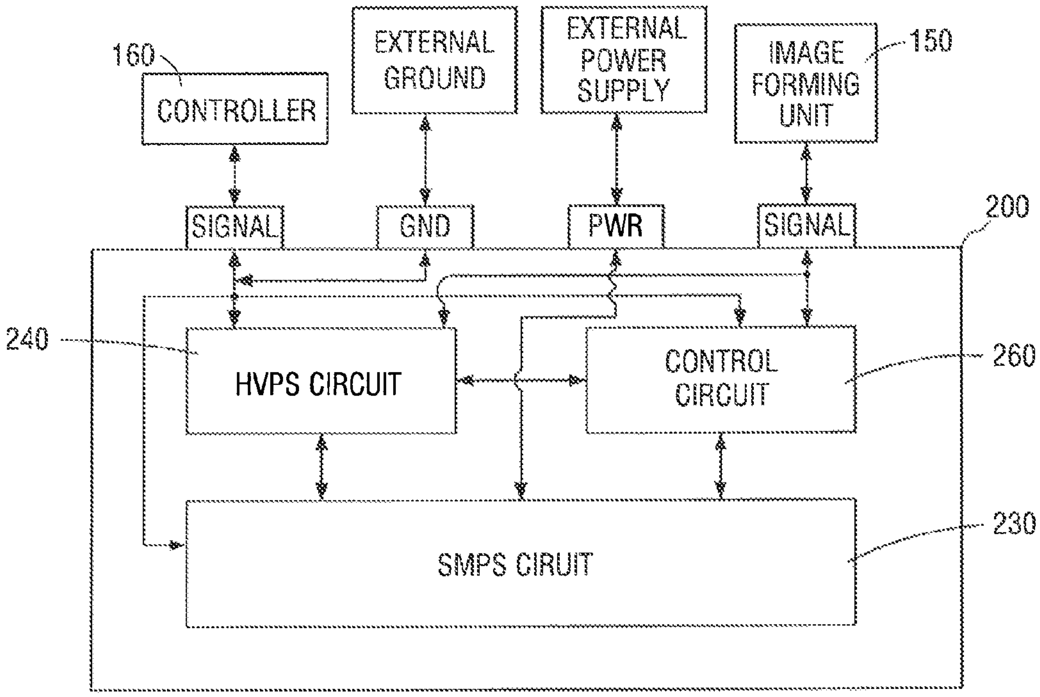

Referring to FIG. 4A, the circuit board 200 may include one or more signal terminals, a ground ("GND") terminal, and a power ("PWR") terminal. The signal terminals of circuit board 200 may be communicatively coupled to, for example, the image forming apparatus 150 and the controller 160 as illustrated in FIG. 1 and described above. The PWR terminal may be coupled to at least one of the power supply unit 130 and the high-voltage power unit 140 of FIG. 1. The GND terminal may be coupled to an external ground that may be, for example, in the image forming apparatus 100. The signal terminals, GND terminal, and the PWR terminal may communicate with and/or may be coupled to at least one of the SMPS circuit 230, the HVPS circuit 240, and the control circuit 260.

In a conventional image forming apparatus, a SMPS circuit, a HVPS circuit, and a control circuit which controls each component in the image forming apparatus are disposed on a separate Printed Circuit Board (PCB). In the exemplary embodiments of the present general inventive concept, the SMPS circuit 230, the HVPS circuit 240, and the control circuit 260 are disposed on a single circuit board 200 so as to reduce the manufacturing cost of the image forming apparatus, as a wire harness to connect the SMPS circuit 230, the HVPS circuit 240, and the control circuit 260 as would be needed if these circuits were on separate boards as with the conventional image forming apparatus. The absence of the wire harness to connect the SMPS circuit 230, the HVPS circuit 240, and the control circuit 260 may reduce the EMI that is typically emitted from conventional wire harnesses of image forming apparatuses. A shield plate 250 may be disposed on a lower side of the circuit board 200 so as to minimize EMI noise that may be emitted from influencing the operation of the SMPS circuit 230, the HVPS circuit 240, and the control circuit 260. As the circuit board 200 of the exemplary embodiments of the present general inventive concept may be a single layer board, reflow processing which is typically used to manufacture circuit boards having two or more layers may be reduced and/or eliminated, thereby reducing manufacturing costs and decreasing manufacturing time.

Figure 5:
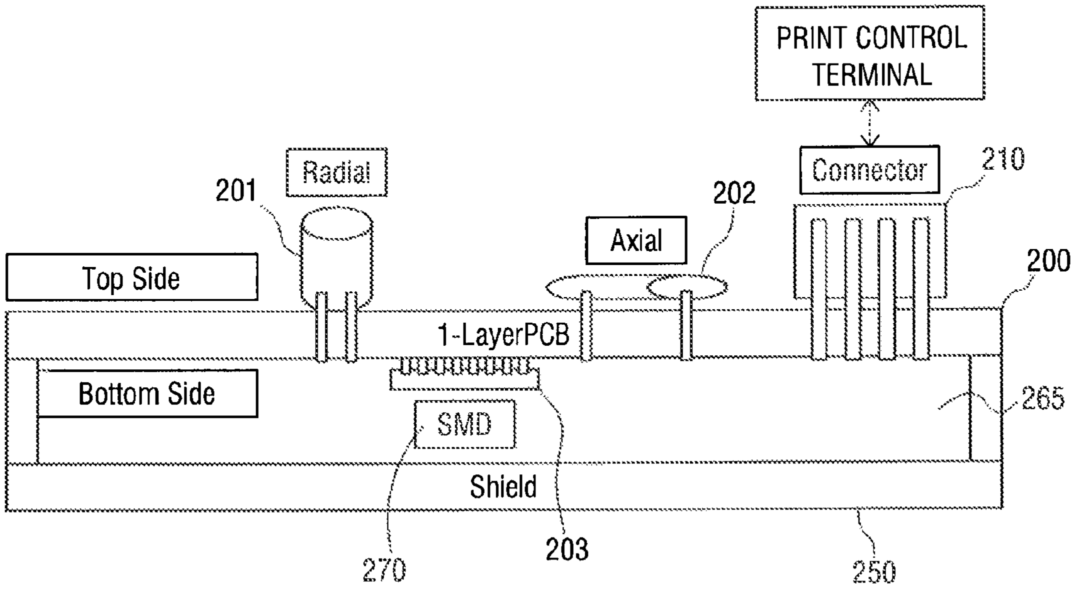

FIG. 5 is a view illustrating a side surface of a circuit board of an image forming apparatus according to exemplary embodiments of the present general inventive concept.

Referring to FIG. 5, in the circuit board 200, a radial circuit element 201, an axial circuit element 202 and a connector 210 from among electronic parts of the SMPS circuit 230 and the HVPS circuit 240 (illustrated in FIGS. 2-3) can be disposed on an upper part (i.e., a "top side" as illustrated in FIG. 5) of a circuit board, and are electrically connected to a conductive layer 265 in a lower part (i.e., a "bottom side" as illustrated in FIG. 5). A SMD 270 of the SMPS circuit 230, the HVPS circuit 240, and the control circuit 260 can be electrically connected to the conductive layer 265 of a lower part. As such, all circuit elements of the SMPS circuit 230, the HVPS circuit 240, and the control circuit 260 are soldered only on a lower part of the circuit board 200, and thus PBS processing may be completed only through wave soldering, without going through reflow processing which is generally employed to design a PCB in more than two layers.

A shield plate 250 may be disposed on a lower side of the circuit board 200. As the shield plate 250 is disposed on the lower side of the circuit board 200, EMI noise emitted from the SoC 261 may be minimized and/or removed. As the shield plate 250 is disposed on the lower side of the control circuit 260, the use of parts such as ferrite core and bead may be reduced.

According to the above-described exemplary embodiments of the present general inventive concept, the SMPS circuit 230, the HVPS circuit 240, and the control circuit 260 can be connected through a conductive layer in the circuit substrate 200, and thus the use of harness which connects the circuits may be reduced. As the circuits are integrated on a single circuit board, the volume of an image forming apparatus may be reduced significantly.

Although several embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An image forming apparatus, comprising:

a power supply unit to convert alternating current (AC) power input to the image forming apparatus into direct current (DC) power;

a high-voltage power unit to convert the converted DC power to a predetermined voltage;

an image forming unit to form an image using the converted predetermined voltage; and a controller to control an operation of the image forming unit, wherein the power supply unit, the high-voltage power unit, and the controller are disposed on a single circuit board and coupled to one another without one or more wire harnesses, wherein a plurality of connectors are disposed on an upper side of the circuit board, wherein the connectors comprise an external communication connector which is connected with a print control terminal, and an AC power connector which receives the AC power, wherein the external communication connector is a universal serial bus (USB) connector, wherein a data line from the USB connector to the controller has a line width of at least 10 mils, and wherein a distance between a first data line and a second data line from among a plurality of data lines is more than 5 mils.

2. The image forming apparatus as claimed in claim 1, wherein the circuit board is a one-layer circuit board having a conductive layer formed on a lower side of the circuit board.

3. The image forming apparatus as claimed in claim 1, wherein at least one of a radial circuit element and an axial circuit element of the power supply unit and the high-voltage power unit is disposed on an upper side of the circuit board.

4. The image forming apparatus as claimed in claim 1, wherein the power supply unit, the high-voltage power unit and a surface-mounted device (SMD) of the controller are disposed on a lower side of the circuit board.

5. The image forming apparatus as claimed in claim 1, wherein the controller is a System on Chip (SoC) in which a microprocessor, a random access memory (RAM) and a flash memory are integrated.

6. The image forming apparatus as claimed in claim 1, wherein the power supply unit is a Switching Mode Power Supply (SMPS), and wherein the high-voltage power unit is a High Voltage Power Supply (HVPS).

7. The image forming apparatus as claimed in claim 1, further comprising:

a shield plate which is mounted on a lower side of the circuit board.

8. The image forming apparatus as claimed in claim 1, further comprising:

a sensor disposed on an upper side of the circuit board to sense whether there is an image forming medium.

9. An image forming apparatus, comprising:

a power supply unit to convert alternating current (AC) power input to the image forming apparatus into direct current (DC) power;

a high-voltage power unit to convert the converted DC power to a predetermined voltage;

an image forming unit to form an image using the converted predetermined voltage; and a controller to control an operation of the image forming unit, wherein the power supply unit, the high-voltage power unit, and the controller are disposed on a single circuit board and coupled to one another without one or more wire harnesses, wherein the power supply unit comprises a first circuit which operates in AC power and a second circuit which operates in DC power, and wherein the first circuit is spaced apart from the controller and the second circuit by more than 8 mm.

10. The image forming apparatus as claimed in claim 9, wherein the first circuit is disposed adjacent to one side of the second circuit and one side of the high-voltage power unit, wherein the second circuit is disposed adjacent to one side of the first circuit and one side of the controller.

11. A circuit board of an image forming apparatus, comprising:

a Switching Mode Power Supply (SMPS) circuit to convert alternating current (AC) power to direct current (DC) power;

a High Voltage Power Supply (HVPS) circuit to convert the converted DC power to a predetermined power; and a control circuit to control an image forming operation of the image forming apparatus, wherein at least a portion of the SMPS circuit, the HVPS circuit, and the control circuit are fixed on a lower side of the circuit board and coupled to one another without one or more wire harnesses.

12. The circuit board as claimed in claim 11, wherein the control circuit includes a System on Chip (SoC) in which a microprocessor, a random access memory (RAM), and a flash memory are integrated.

13. The circuit board as claimed in claim 11, wherein the SMPS circuit comprises:

a first circuit which operates in AC power; and a second circuit which operates in DC power.

14. The circuit board as claimed in claim 13, wherein the first circuit is spaced apart from the controller and the second circuit by more than 8 mm.

15. The circuit board as claimed in claim 13, wherein the first circuit is disposed adjacent to one side of the second circuit and one side of the HVPS circuit, wherein the second circuit is disposed adjacent to one side of the first circuit and one side of the control circuit.

16. The circuit board as claimed in claim 11, further comprising:

a plurality of connectors which are disposed on an upper side of the circuit board and are electrically connected to an image forming unit of the image forming apparatus.

17. The circuit board as claimed in claim 11, further comprising:

a sensor disposed on an upper side of the circuit board to sense whether there is an image forming medium.

18. A circuit board of an image forming apparatus, comprising:

a first power circuit to transform a first power type to a second power type;

a second power circuit to convert the second power type to a predetermined power level;

a control circuit to control an image forming operation of the image forming apparatus; and at least one communication connector disposed on a second side of the circuit board, wherein a data line from the at least one communication connector to the controller has a line width of at least 10 mils, wherein a distance between a first data line and a second data line is more than 5 mils, and wherein at least a portion of the first power circuit, the second power circuit, and the control circuit are fixed on a first side of the circuit board.

19. An image forming apparatus, comprising:

a power supply to convert an input first power type to the image forming apparatus into a second power type;

a power transformer to transform the second power type to a predetermined voltage level;

an image forming unit to form an image using the predetermined voltage level; and a controller to control an operation of the image forming unit, wherein the power supply, the power transformer, and the controller are disposed on a single circuit board, and wherein the power supply, the power transformer, and the controller are disposed on a first side of the single circuit board.

20. An image forming apparatus, comprising:

a power supply to convert an input first power type to the image forming apparatus into a second power type;

a power transformer to transform the second power type to a predetermined voltage level;

an image forming unit to form an image using the predetermined voltage level;

a controller to control an operation of the image forming unit, and at least one communication connector disposed on a second side of the circuit board, wherein a data line from the at least one communication connector to the controller has a line width of at least 10 mils, and wherein a distance between a first data line and a second data line is more than 5 mils, wherein the power supply, the power transformer, and the controller are disposed on a single circuit board.

* * * * *